(12) United States Patent
Ramakrishnan et al.

(10) Patent No.: US 10,951,678 B2
(45) Date of Patent: *Mar. 16, 2021

(54) METHOD AND APPARATUS FOR CONTENT DISTRIBUTION OVER A NETWORK

(71) Applicant: AT&T Intellectual Property I, L.P., Atlanta, GA (US)

(72) Inventors: Kadangode Ramakrishnan, Berkeley Hgts, NJ (US); Yifan Hu, Mountain Lakes, NJ (US); Robert Bell, Murray Hill, NJ (US); Jeffrey Pang, Berkeley, CA (US); Jeffrey Erman, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/783,818

(22) Filed: Feb. 6, 2020

(65) Prior Publication Data
US 2020/0177656 A1 Jun. 4, 2020

Related U.S. Application Data

(60) Continuation of application No. 16/292,570, filed on Mar. 5, 2019, now Pat. No. 10,594,754, which is a (Continued)

(51) Int. Cl.
*H04L 29/06* (2006.01)
*G06F 16/957* (2019.01)
(Continued)

(52) U.S. Cl.
CPC ...... *H04L 65/601* (2013.01); *G06F 16/90324* (2019.01); *G06F 16/9574* (2019.01);
(Continued)

(58) Field of Classification Search
CPC ............... H04L 65/601; H04L 65/1016; H04L 65/1069; H04L 65/4084; H04L 65/80;
(Continued)

(56) References Cited

U.S. PATENT DOCUMENTS 6,701,316 B1 * 3/2004 Li ................... G06F 16/9574
370/395.41
6,968,380 B1 * 11/2005 Singhal .................. H04L 67/02
709/222

(Continued)

FOREIGN PATENT DOCUMENTS

CN 201480059763.1 6/2016
WO WO2013073866 A1 5/2013
WO 2013100904 A1 7/2013

OTHER PUBLICATIONS

"International Preliminary Report on Patentability, PCT/US14/55591", dated May 12, 2016.
(Continued)

*Primary Examiner* — Alexander Gee
(74) *Attorney, Agent, or Firm* — Guntin & Gust, PLC; Kenneth Kwan

(57) ABSTRACT

A method that incorporates teachings of the subject disclosure may include, for example transmitting, via a connection to a network having an available digital bandwidth, a first pre-fetch media content item of media content items included in the a media recommendation transmitted to a communication device, the first pre-fetch media content item having a first rank. Responsive to a determination of a change in the available digital bandwidth, the transmitting of the first pre-fetch media content item is stopped and a second pre-fetch media content item of media content items included in the media recommendation is transmitted via the
(Continued)

connection to the network. The second pre-fetch media content item has a second rank. Other embodiments are disclosed.

20 Claims, 9 Drawing Sheets

Related U.S. Application Data division of application No. 15/072,403, filed on Mar. 17, 2016, now Pat. No. 10,270,828, which is a continuation of application No. 14/068,042, filed on Oct. 31, 2013, now Pat. No. 9,326,026.

(51) Int. Cl.
*G06F 16/9032* (2019.01)
*H04W 4/70* (2018.01)
*G06Q 30/06* (2012.01)
*G06Q 50/00* (2012.01)
*H04L 29/08* (2006.01)
*H04N 21/414* (2011.01)
*H04N 21/454* (2011.01)
*H04N 21/433* (2011.01)
*H04N 21/81* (2011.01)
*H04N 21/466* (2011.01)

(52) U.S. Cl.
CPC ..... *G06F 16/9577* (2019.01); *G06Q 30/0631* (2013.01); *G06Q 50/01* (2013.01); *H04L 65/1016* (2013.01); *H04L 65/1069* (2013.01); *H04L 65/4084* (2013.01); *H04L 65/80* (2013.01); *H04L 67/02* (2013.01); *H04L 67/22* (2013.01); *H04L 67/2842* (2013.01); *H04L 67/30* (2013.01); *H04L 67/306* (2013.01); *H04N 21/41407* (2013.01); *H04N 21/4331* (2013.01); *H04N 21/454* (2013.01); *H04N 21/466* (2013.01); *H04N 21/4668* (2013.01); *H04N 21/8173* (2013.01); *H04W 4/70* (2018.02)

(58) Field of Classification Search
CPC ..... H04L 67/02; H04L 67/22; H04L 67/2842; H04L 67/30; H04L 67/306; H04W 4/70; H04W 4/005; G06F 16/9574; G06F 16/9577; G06F 16/90324; G06F 17/3097; G06Q 30/0631; G06Q 50/01; H04N 21/41407; H04N 21/4331; H04N 21/454; H04N 21/466; H04N 21/4668; H04N 21/8173; H04N 21/44222; H04N 21/44204; H04N 21/6582; H04N 21/4532; H04N 21/25; H04N 21/251; H04N 21/45; H04N 21/4755; H04N 21/25891
See application file for complete search history.

(56) References Cited

U.S. PATENT DOCUMENTS

| | | |
|---|---|---|
| 7,370,342 B2 | 5/2008 | Ismail et al. |
| 7,698,302 B2 | 4/2010 | Wendelrup |
| 7,853,622 B1 | 12/2010 | Baluja et al. |
| 8,032,526 B2 | 10/2011 | Fukazawa et al. |
| 8,060,827 B2 | 11/2011 | Fischer et al. |
| 8,301,776 B2 | 10/2012 | Hebert et al. |
| 8,356,317 B2 | 1/2013 | Errico et al. |
| 8,438,598 B2 | 5/2013 | Sakai et al. |
| 8,443,390 B2 | 5/2013 | Lo et al. |
| 8,484,314 B2 | 7/2013 | Luna et al. |
| 2002/0059434 A1 | 5/2002 | Karaoguz et al. |
| 2005/0022239 A1 | 1/2005 | Meuleman et al. |
| 2006/0184968 A1 | 8/2006 | Clayton et al. |
| 2006/0271972 A1 | 11/2006 | Pai et al. |
| 2007/0130585 A1 | 6/2007 | Perret et al. |
| 2009/0089831 A1 | 4/2009 | Woch |
| 2009/0100469 A1 | 4/2009 | Conradt et al. |
| 2009/0113480 A1 | 4/2009 | Allard et al. |
| 2009/0158342 A1 | 6/2009 | Mercer et al. |
| 2009/0163183 A1 | 6/2009 | O'Donoghue et al. |
| 2009/0292819 A1 | 11/2009 | Kandekar et al. |
| 2010/0169927 A1 | 7/2010 | Yamaoka et al. |
| 2011/0035362 A1 | 2/2011 | Uemura et al. |
| 2011/0087842 A1* | 4/2011 | Lu ................ G06F 16/9535 711/126 |
| 2011/0093415 A1 | 4/2011 | Rhee et al. |
| 2011/0258336 A1* | 10/2011 | Salomons ............. H04L 67/28 709/231 |
| 2011/0264528 A1 | 10/2011 | Whale |
| 2011/0283306 A1 | 11/2011 | Davis et al. |
| 2012/0210364 A1 | 8/2012 | Lee et al. |
| 2012/0317123 A1 | 12/2012 | Green et al. |
| 2013/0014150 A1 | 1/2013 | Seo et al. |
| 2013/0042013 A1 | 2/2013 | Bouazizi |
| 2013/0046623 A1 | 2/2013 | Moritz et al. |
| 2013/0081084 A1 | 3/2013 | Scheer |
| 2013/0122934 A1* | 5/2013 | Branch ................ H04L 67/306 455/456.3 |
| 2013/0166690 A1 | 6/2013 | Shatzkamer |
| 2013/0332962 A1 | 12/2013 | Moritz et al. |
| 2014/0223480 A1 | 8/2014 | Berry et al. |
| 2016/0205161 A1 | 7/2016 | Ramakrishnan et al. |
| 2019/0199769 A1 | 6/2019 | Ramakrishnan et al. |

OTHER PUBLICATIONS

Chorianopoulos, Konstantinos, "Personalized and mobile digital TV applications", Multimed Tools Appl., 36:1-10, 2008.
Stuedi, Patrick, "WhereStore: Location-based Data Storage for Mobile Devices Interacting with the Cloud", MCS' 10, 8 pp., Jun. 15, 2010.
Wang, Xiaofei, "AMES-Cloud: A Framework of Adaptive Mobile Video Streaming and Efficient Social Video Sharing in the Clouds", IEEE Transactions on Multimedia, pp. 1-21, 2003.
Wang, Xiaofei, "Cloud-Assisted Adaptive Video Streaming and Social-Aware Video Prefetching for Mobile Users", Mobil Cloud Computing, IEEE Wireless Commumications, pp. 72-79, Jun. 2003.

* cited by examiner

METHOD AND APPARATUS FOR CONTENT DISTRIBUTION OVER A NETWORK

CROSS-REFERENCE TO RELATED APPLICATION(S)

This application is a continuation of U.S. patent application Ser. No. 16/292,570, filed Mar. 5, 2019, which is a divisional application of U.S. patent application Ser. No. 15/072,403, filed Mar. 17, 2016 (U.S. Pat. No. 10,270,828), which is a continuation of U.S. patent application Ser. No. 14/068,042, filed Oct. 31, 2013 (now U.S. Pat. No. 9,326,026). All sections of the aforementioned application(s) and patent(s) are incorporated herein by reference in their entirety.

FIELD OF THE DISCLOSURE

The subject disclosure relates to a method and apparatus for content distribution over a network.

BACKGROUND

Modern telecommunications systems allow consumers to access a large variety of content from mobile communication devices. Consumers are no longer bound to specific locations when communicating with others or when enjoying content, including video programming. Network capabilities have expanded and have created additional interconnections and new opportunities for using mobile communication devices in a variety of situations. Intelligent devices offer new means for the enjoyment of network interactions in ways that anticipate consumer desires.

BRIEF DESCRIPTION OF THE DRAWINGS

Reference will now be made to the accompanying drawings, which are not necessarily drawn to scale, and wherein.

DETAILED DESCRIPTION

Figure 1:
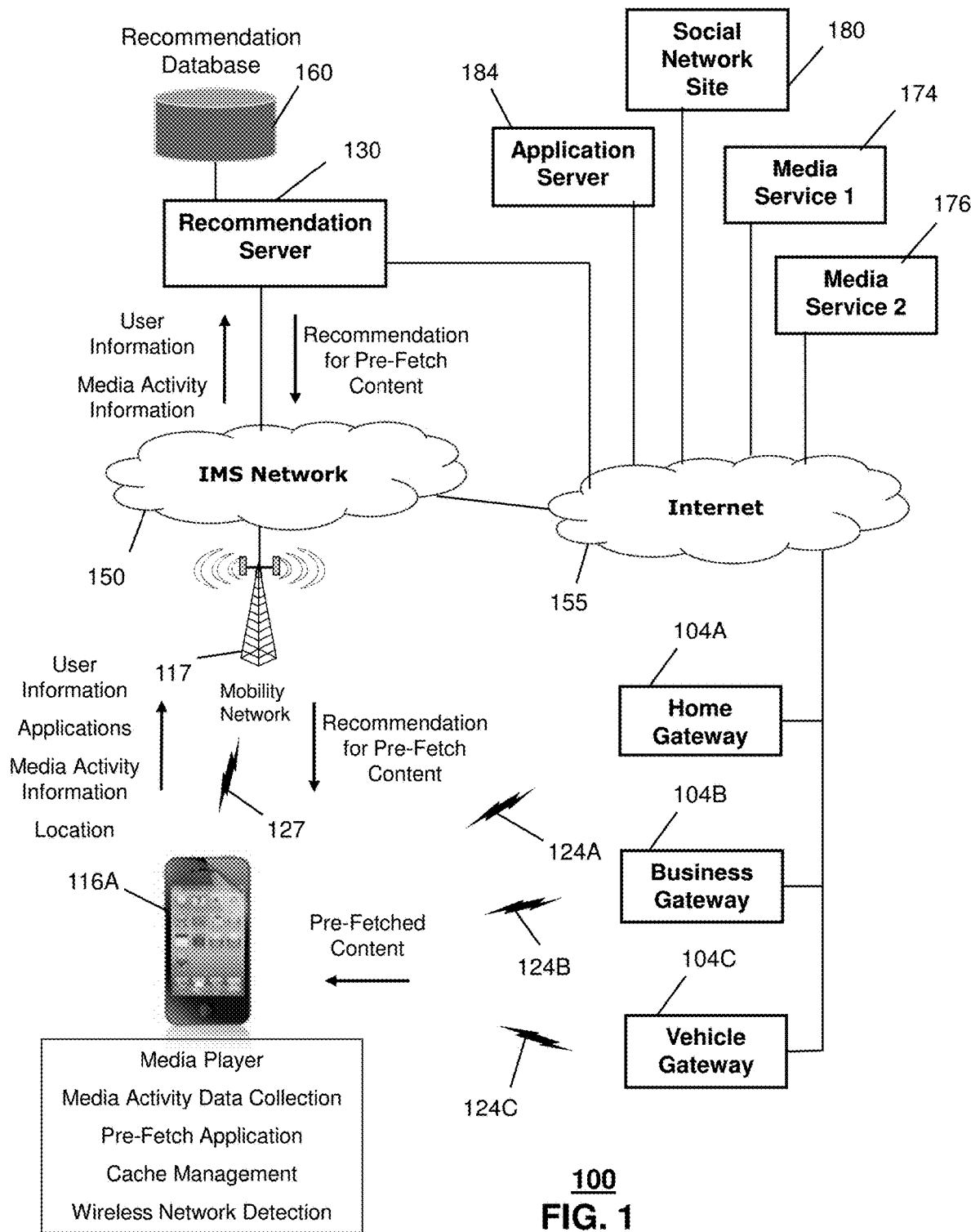
FIG. 1 depicts illustrative embodiments of a system that can be utilized for providing recommendations for media content to mobile communication devices, where the media content is stored on to the mobile communication devices in anticipation of user requests for the content.

The subject disclosure describes, among other things, illustrative embodiments for receiving media activity information from a mobile communication device at a server and generating recommendations for media content that could be consumed at the mobile communication device based on the media activity. The server can send the recommendations to the mobile communication device. The mobile device can pre-fetch media content from a wireless access site according to the recommendations. Other embodiments are included in the subject disclosure.

One embodiment of the subject disclosure includes a mobile communication device comprising a memory to store executable instructions and a processor. The processor, responsive to executing the executable instructions, can perform operations including performing wireless telephony communications via a first wireless interface and for performing media-related activities. The processor can also perform operations for transmitting information associated with the media-related activities to a server. The processor can further perform operations for receiving a media recommendation from the server. The media recommendation can be generated according to the information associated with media-related activities. The processor can perform operations for detecting a wireless communication access point via a second wireless interface and, in turn, initiating communications with a network via the second wireless interface according to the wireless communication access point. The processor can further perform operations for downloading a media content item of the media recommendation from a content provider via the second wireless interface to the network and for storing the media content item in a media cache of the memory. The processor can further perform operations for receiving a request for access to the media content item, for accessing the media content item from the media cache according to the request, and, in turn, for presenting the media content item that is accessed at a display.

One embodiment of the subject disclosure includes a computer-readable storage device, comprising executable instructions. The executable instructions can cause a processor to perform operations comprising receiving information associated with media-related activities of a mobile communication device. The mobile communication device can perform wireless telephony communications via a first wireless interface. The executable instructions can also cause the processor to perform operations for generating a media recommendation according to the information associated with media-related activities. The executable instructions can also cause the processor to perform operations for transmitting a media recommendation to the mobile communication device. A media content item of the media recommendation can be downloaded to the mobile communication device via a second wireless interface.

One embodiment of the subject disclosure includes a method including performing, by a wireless communication device comprising a processor, wireless telephony communications via a first wireless interface. The method can also include transmitting, by the wireless communication device, information associated with media-related activities to a server. The method can further include receiving, by the wireless communication device, a media recommendation from the server. The media recommendation is generated according to the information associated with media-related activities. The method can include initiating, by the wireless communication device, communications with a network via a second wireless interface. The method can further include downloading, by the wireless communication device, a media content item of the media recommendation from a content provider via the second wireless interface and, in turn, presenting the media content item at a display.

FIG. 1 depicts an illustrative embodiment of a system 100 that can be utilized for collecting information from devices in system and generating media content recommendations for those devices. The system 100 can further be used for allows devices to pre-fetch media content, according to the recommendations, from media content sources via wireless access points. In this way, the system 100 facilitates access to media content by mobile communication devices 116A, via inexpensive, large bandwidth pathways, such as wireless local area network (LAN) connections 124A-C. By pre-fetching, the media content desires of a user of a mobile communication device 116A are anticipated and are stored in the memory of the devices 116A. In this way, access to the media content can be immediate, upon request by the user, and the media content can be provisioned into the mobile communication device 116A without using expensive and scares mobility network bandwidth.

In one embodiment, the system 100 can include several communication and information networks 150 and 155. The system 100 can include a subscription telecommunication service, such as an Internet Protocol Multimedia Subsystem (IMS) network 150 for providing cellular/mobile communications, Internet access, and content to mobile communication devices 116A via a mobility network of mobile base stations 117. The system can include a subscription content service, such as an Internet Protocol Television (IPTV) network for providing media content to subscribers. The IPTV network can be part of a cable, satellite, or DSL based media content delivery system. The media content can be any type of viewable content, such as broadcast television, cable or premium television, video on demand, or pay-per-per view television. The IPTV network can deliver media content to media processing devices and media display devices at subscriber locations via gateway devices. The system can include an Internet network 155 with access to the World-wide web (WWW) and/or cloud-based services.

In one embodiment, the system 100 can include one or more servers 130 that are associated with the IMS network 150. In one embodiment, a recommendation server 130 can communicate with mobile communication devices 116A over the IMS network 150. The mobile communication device 116A can communicate with the IMS network 150 using one or more components of a mobility network 117, such as cellular base stations for receiving and transmitting wireless communication signals. The recommendation server 130 can receive various types of information from the mobile communication device 116A. For example, the recommendation server 130 can receive information associated with one or more users of the mobile communication device 116A. A user profile can provide the recommendation server 130 with demographic information, such as the age and sex of the user, and/or subscription level information, such as data plan capability. The user profile can also provide configuration information from the mobile communication device, such as memory settings for storing media content and default applications for accessing media content.

The mobile communication device 116A can further provide information regarding social networking and call networking activities of a user of the device 116A. For example, the mobile communication device 116A can provide information regarding social network applications. The recommendation server 130 can receive, either, directly, from the mobile communication device 116A or, indirectly, via access to a social network site 180 by way of the Internet 155, access to posting information submitted to the social network site 180 by a user of the mobile communication device 116A or by friends/acquaintances of the user. In this way, the recommendation server 130 can gain access to references to media content by the user or his/her social network contacts. For example, the recommendation server 130 can gain information associated with comments and/or affiliations ("likes") and/or links to specific media content, artists, producers, and/or content providers by the user of the mobile communication device 116A and/or social network acquaintances of that user. The mobile communication device 116A can track information on telecommunication activities performed with the device 116A, including text messages and calls. The telecommunication activity information can be used by the recommendation server 130 to determine a calling/texting network for the user, where a set of additional mobile devices can be identified and can, further, be subject to information collection activities for the purposes of generating recommendations for the mobile communication device 116A. In another embodiment, information can be collected from the network from deep packet inspection using a network monitoring tool.

The mobile communication device 116A can provide information to the recommendation server 130 regarding applications that have been loaded onto the mobile communication device 116A. In particular, the mobile communication device 116A can provide information describing applications that provide access to and/or reproduction capabilities for media content. For example, the recommendation server 130 can receive information regarding application downloads from one or more application servers 184 and/or one or more media content services 174 and 176. The recommendation server 130 can collect information regarding media content access at the mobile communication device 116A by way of applications, including information regarding media content type, frequency, title, artist, purchased vs. free access, date/time, and the like.

The recommendation server 130 can further collect information from the mobile communication device 116A regarding subscriptions by the user for media content access. The recommendation server 130 can determine if one or more subscription media content services 174 and 176 allow for sharing of information regarding media content downloads by the user and/or by other users. The recommendation server 130 can determine if a subscription service can be used for subsequent downloading of media content into the mobile communication device 116A under the direction of a recommendation list generated by the recommendation server 130.

The mobile communication device 116A can also transmit to the recommendation server 160 information associated with media activity at the device 116A. The mobile communication device 116A can track media content, including video, audio, pictures, and/or text that are accessed by the device 116A. For example, all media content that is accessed from media content service sites 174 and 176, social network sites 180, and/or any other source of downloadable content can be logged in a media content history log. In another embodiment, the mobile communication device 116A can log any media content that is presented, reproduced, loaded onto, and/or viewed at the device 116A. For example, the mobile communication device 116A can log media content captured by a camera and/or microphone of the device 116A and/or loaded onto the device via a port, such as a USB port. The mobile communication device 116A can transmit to the recommendation server 130 information regarding the logged media activities, where the information can be raw log information including titles, dates, sources, and/or metadata associated with the content. In one embodiment, the mobile communication device 116A can provide filtered or summarized information, such as only providing information regarding media content downloaded via the network 100 or only information regarding media content that was provided under a subscription agreement.

The recommendation server 130 can also collect information regarding the location of the mobile communication device 116A. For example, the recommendation server 130 can receive information on the present location, one or more past locations, a summary of frequent locations, an anticipated future location, and/or movement information for the mobile communication device 116A. The location information can be collected by the mobile communication device 116A, which can rely on global positioning system (GPS) data from a satellite signal, reported location information from one or more base stations of the mobility network 117, and/or self-reporting by the user of the mobile communication device 116A.

The recommendation server 130 can also collect information from the IMS network 150 and/or the Internet 155 regarding media content that is distributed over the network 100. For example, if the recommendation server 130 is part of a service provider network that handles media content traffic, then the recommendation server 130 can access network usage information to collect information about popularity of media content (e.g., number of downloads, traffic across network elements) and/or to collect meta data information associated with media content (rating, title, artist, source, topic, related content). The recommendation server 130 can gain visibility to media activity information for both the mobile communication device 116A and to media access activities for many users of network resources. For example, a network monitoring tool can be used to monitor deep packet information transmitted over the network.

In one embodiment, the recommendation server 130 can generate recommendations for media content that can be provided to the mobile communication device 116A. The recommendation server 130 can base the recommendation on factors including information that is collected from the mobile communication device 116A. For example, the recommendation server 130 can consider information regarding the user profile, the media activity, the applications, and/or the location of the mobile communication device 116A when determining a recommendation for media content the mobile communication device 116A. The recommended media content can be intended as a prediction of the media content that the user of the mobile communication device 116A will be requesting in the near future. In other words, the recommendation server 130 can use the collected information from the mobile communication device 116A to form a prediction of media content that the user of the mobile communication device 116A would likely desire to experience either of their own accord or in response to the recommendation. Either way, information from the user's mobile communication device 116A can be used to formulate a set of recommendations that is likely to match well with the desires of the user.

In another embodiment, the recommendation server 130 can use media activity information collected from the network 100 using a monitor in the network, which may reflect information about media content (e.g., popularity, metadata), to further direct the generation of the recommendation. For example, information about relative popularity of a specific media item, such as a video clip of a play in a football game, can be combined with information about the user's past video viewing to confirm or to deny the inclusion of the video clip of the football play as an item in the recommended list. If the information from the user's mobile communication device 116A indicates that the user watches excerpts from the Daily Show on a regular basis and network information indicates that a new Daily Show clip has become popular in the hours after its first broadcast, then the recommendation server 130 can include a link to the Daily Show clip in its list of recommended media content. Conversely, if the information from the mobile communication device 116A indicates that the user has already viewed this clip, then recommendation server can omit the link, regardless of an indicated popularity in the network.

In one embodiment, the recommendation server 130 can use the user profile information from the mobile communication device 116A to direct the generation of the recommendation. For example, if the user profile indicates that the user is a member of the baby boomer generation, then the recommendation server 130 can bias choices of media content recommendations toward items that are currently popular with other baby boomers. The recommendation server 130 can choose to omit an otherwise popular item, such as the latest song from a teenage band, where the user profile of the mobile communication device indicates that the user is in her seventies. In another embodiment, configuration information from the mobile communication device 116A can indicate that the mobile communication device 116A includes a very limited display capability. In such a case, the recommendation server 130 can omit from the recommendation an otherwise popular picture or video or can specify in the recommendation a link to a version of the picture or video that can be reproduced with the limited display capability. Similarly, if the configuration or user profile information from the mobile communication device 116A indicates that the user has a device that is especially configured for high definition video, then the recommendation server can tailor the selections in the recommendation list to take advantage of this feature on the assumption that the user is more likely to desire this level of video availability.

In one embodiment, the recommendation server 130 can use information regarding applications loaded on the mobile communication device 116A for directing the generation of the recommendation. For example, if the mobile communication device 116A has loaded an application for viewing videos from a specific media content source 174, then the recommendation server 130 can bias the recommendation to specifically include media content from the media content source 174. In one embodiment, the recommendation engine 130 can search the media content source 174 associated with the application for information regarding popular media content, recommended content, and/or new content, and base recommendations upon the search results. In one embodiment, the recommendation server 130 can select media content that is in a format specifically for viewing via a loaded application at the mobile communication device 116A.

In one embodiment, the recommendation server 130 can use a history of media activity from the mobile communication device 116A to determine recommendations. For example, recommendations can be biased toward media content having genres, artists, directors, and/or media sources that are the same as, or similar to, those that a user of the mobile communication device 116A has experienced in the past. The recommendation server 130 can determine, from the history of media activity, if specific media content has been viewed multiple times or, conversely, if only a portion of the content was viewed. Inferences of user affinity for the content can be made by the recommendation server 130 based on this information. The recommendation server 130 can determine if the media content was viewed through a link of a social network site 180 and can use this information to make recommendations based on additional information from that social network site 180.

In one embodiment, the recommendation server 130 can use location information to direct media content recommendations. For example, the media content that is known to be more popular or in higher demand in a specific location, city, and/or region, can be recommended. If the mobile communication device 116A is located in New York City, then the recommendation server 130 can recommend a summary of local New York City news or sports. If the recommendation server 130 discovers that the mobile communication device 116A has moved to a new location, then this can trigger the recommendation server 130 to issue a new set of recommendations. For example, if the mobile communication device 116A leaves New York City for Tokyo, Japan, the recommendation server 130 can maintain the New York City local sports while, perhaps, substituting a summary of an English language weather report for Tokyo for a previously recommended New York State weather report.

The recommendation server 130 can use more than one type of information collected from the mobile communication device 116A in the generation of the recommendation. For example, information about a new application that has been loaded to play a specific video game can be combined with information that the user has listened to an Alternative Rock album several times to formulate a recommendation for a new YouTube video that combines video captures from the video game with music from the Alternative Rock artist. For example, user information can indicate that the mobile communication device 116A is configured to include an expanded memory card for storing video content, while location information from the mobile communication device 116A indicates that the device is located near a national park. The recommendation server 130 can deduce from this information that the user may be visiting the national park and can recommend a series of high definition informational videos regarding the wildlife and seasonal vegetation of the park.

In one embodiment, the recommendation server 130 use information from IMS network 150 and/or Internet regarding media content popularity and/or metadata to generate recommendations. For example, network traffic can indicate that a specific media content item or a media content source 176 is very popular. The recommendation server 130 can use this information to recommend the media content item or to recommend several of the most popular media content items from the media content source 176. In one embodiment, the recommendation server can combine the information captured from traffic on the IMS network 150 and/or Internet with information from the individual mobile communication device 116A for making recommendations to the device 116A. For example, the recommendation server 130 can generate an initial recommendation for content based on popularity data from traffic over network elements of the system 100 making up a portion of the Internet 155. The recommendation server 130 can then modify the initial recommendation using media activity information specifically collected from the mobile communication device 116A to generate a final recommendation. In another example, the recommendation server 130 can generate some media content recommendations based on network popularity and other media content recommendations based on the media activity information and generate a final recommendation including both types of media content.

Figure 2:
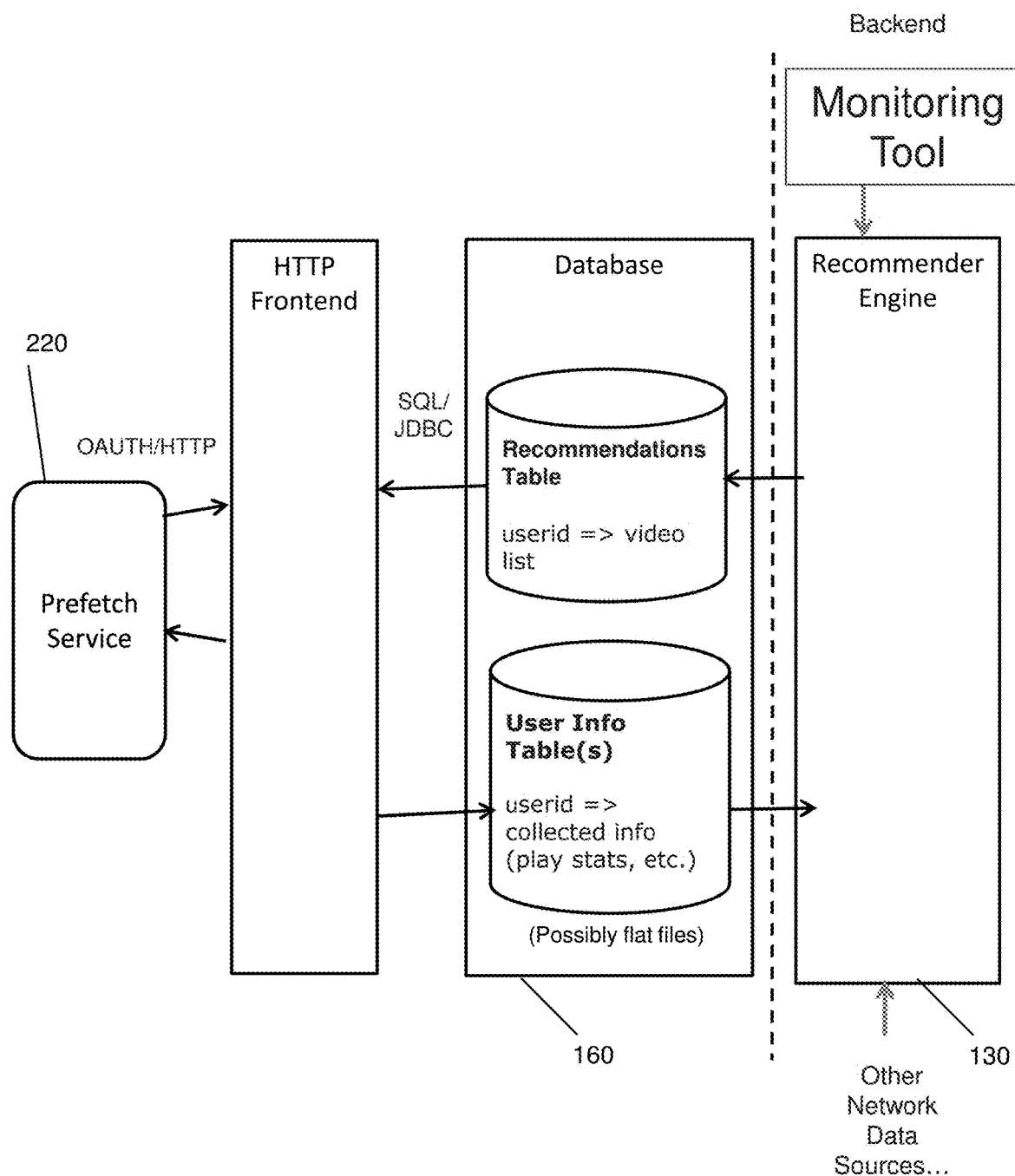
FIG. 2 depicts a block diagram of an architecture for using a recommendation server.

FIG. 2 depicts a block diagram of architecture for using a recommendation server. In one embodiment, the recommendation server 130 can store recommendations that it has generated in a recommendation database 160. The recommendation database 160 can include media content recommendations that have been generated by the recommendation server for many mobile communication devices 116A. The database 160 can further include recommendations generated by multiple recommendation servers 130. In one embodiment, a series of distinct recommendation servers 130 can be associated with distinct major providers and/or types of content. For example, a recommendation server 130 can be dedicated to Hulu™ and another recommendation server 130 dedicated to YouTube™. Recommendations from dedicated recommendation servers can be combined and sent to mobile communication device 116A or can be sent separately to the devices and combined after reception. In one embodiment, the recommendation server can use the recommendation database for generating a new recommendation. For example, the recommendation server 130 can resend a previous recommendation to a mobile communication device 116A on demand or if the previous recommendation was lost. In one embodiment, the recommendation server 130 can analyze media activity information from the mobile communication device 116A to determine which media content items were selected by a user for viewing/listening, which were selected for deletion, and which were marked for future viewing. The recommendation server 130 can, in turn, compare the media activity information to the previous recommendation. The effectiveness of recommendations can be assessed and improved via this comparison. The recommendation server 130 can re-recommend an item that was marked for future viewing/listening, recommend new items that are similar to items that were recommended and viewed in the past, omit recommendations for new items similar to prior recommended items that did not trigger interest.

In one embodiment, the recommendation service can be made available to the mobile communication device 116A as a service. In one embodiment, the mobile communication device 116A can be configured with a media reproduction application and the recommendation service can be integrated into this media reproduction application. In another embodiment, the recommendation service can be a plug-in addition to the media reproduction application. In another embodiment, the recommendation server and the media reproduction application can be separate applications. In one embodiment, recommendations for media content items that are provided to the mobile communication device 116A by the recommendation server 130 can be displayed as selectable icons or links in a graphical user interface of the media reproduction application. If a user selects one of the recommended items, then the media reproduction application determines if the media content item has been previously downloaded and stored, in whole or in part, into a memory cache of the mobile communication device 116A. If the selected media is available from the cache, then the media reproduction application can access the stored copy and can begin reproduction of the content via the display and/or audio capabilities of the device 116A. If the selected media content is not available from the memory cache, then the media reproduction application can initiate a request for the mobile communication device 116A to download the media content from a media content service 174 as directed by address information associated with the selectable icon or link.

In one embodiment, the mobile communication device 116A can include a wireless local area network (Wi-Fi) capability in addition to a cellular data and telecommunications capability. When a recommended media content item is selected and is found to not be available in the memory cache, the mobile communication device 116A can access the mobile content service 174 via the internet network 155 by way of either the mobility network 117 and the IMS network 150 or a wireless communications link to a local area network. In most cases, it is preferable to download the media content using the wireless local area network if it is available. Most modern wireless local area network connections contain far more data transmission capacity than cellular telephony systems. In addition, in many cases the subscriber of the mobile communication device 116A is subject to limitations on data downloading and/or may have to pay additional fees.

In one embodiment, the mobile communication device 116A can detect the presence of one or more wireless networks that can be supported by one or more access devices, such as gateway or router devices 104A-C. The gateway devices 104A-C can be part of a communication infrastructure at, for example, a home, business, or vehicle. A gateway device 104A can be connected to the internet network 155 via a service provider system that can provide constant or nearly constant data communications. The gateway device 104A can provide a Wi-Fi communication link between the gateway device 104A and nearby devices that are Wi-Fi capable. In one embodiment, the mobile communication device 116A can detect an available wireless network and can automatically connect to the gateway device for supporting data communications through the internet network 155. In another embodiment, the mobile communication device 116A can signal the user of the device 116A to indicate the detection of the wireless network and to allow the user to initiate the link.

In one embodiment, the mobile communication device 116A can receive a recommendation from the recommendation server 130 via the IMS network 150 or, if available, the gateway device 104A. The recommendation server 130 can "push" the recommendation to the mobile communication device 116A. In a push system, the recommendation server 130 can initiate a transmission according to detection of one or more condition at the recommendation server 130. For example, the recommendation server 130 can be configured to transmit a new recommendation periodically or according to a calendar/time schedule or based on an occurrence of an event, such as a notification from a service provider network. The recommendation server 130 can then notify the mobile communication device 116A of the availability of a new recommendation. The notification can be performed according to a machine-to-machine messaging service. The notification can include a text message or a short messaging service (SMS) message that can be read by the user of the mobile communication device 116A. In one embodiment, the user of the mobile communication device 116A can be notified and required to respond affirmatively to the notification in order to trigger receipt of the recommendation.

In one embodiment, the mobile communication device 116A can be configured to "pull" the recommendation from the recommendation server 130. In a "pull" system, the mobile communication device 116A can initiate the transmission according to detection of one or more conditions by the mobile communication device 116A. For example, the mobile communication device 116A can be configured to request a new recommendation periodically or according to a calendar/time schedule or based on an occurrence of an event, such as a request by a user of the device 116A. The mobile communication device 116A can notify the recommendation sever 130 of the request via machine-to-machine messaging service or a short messaging service (SMS) messaging. The recommendation sever 130 can respond by sending a currently available recommendation or by indicating to the mobile communication device 116A that the recommendation will be sent at a later time.

In one embodiment, the recommendation can include one or more references to media content. Each reference to a media content item can include access information for directing the mobile communication device 116A to a media content source 174 for downloading the media content. The access information can include an internet address, such as a uniform resource locator (URL). The internet address can be included in a session initiation protocol (SIP) message. The access information can include authorization codes or keys for enabling the media content service 174 to authorize the access. The access information can include date and/or time stamp information to enable or disable access to the media content during specific time periods. For example, the recommendation can reference a yet-to-be-released media content item. The access information can include a time stamp that will inform the user of the mobile communication device 116A that the media content is not available until the date of the time stamp and will prevent the mobile communication device 116A from fruitlessly trying to perform the download before the media content is made available.

Each reference can include metadata information that describes the media content. This information can be in the form of text information and/or graphical information and/or video information. The mobile communication device 116A can process the metadata information to produce a listing element for the media content. Each listing element can include textual information describe various aspects of the media content, such as title, description, length, artist(s), data of production, reviews, and/or date of release. The listing element can include graphical representations of the media content, such as images or screen captures of the content, images of an artist or an artifact from the content, and/or a logo or trademark associate with the item. The listing element can also include information to inform the user that the item has been recommended for viewing/listening. The listing element can also include an indicator, such as a graphical element, to notify the user whether the associated media content is currently available in the cache memory of the mobile communication device 116A. The listing element can include a selection element to allow the user to select the media content item for immediate viewing, for later viewing, or for deletion from the recommendation list.

The recommendation can include a constant number or references or a variable number of references. For example, the recommendation can be configured to always provide a set number suggested media content items, such as a "top five" or "top ten" or "top twenty" items. The recommendation can be configured to match the number of recommendations to a user selectable limit. For example, the user can configure the mobile communication device 116A for a daily "top five" media content recommendation. The recommendation server 130 can detect this configuration and generate a recommendation limited to five items. In one embodiment, the recommendation server 30 can detect a hardware limitation associated with the mobile communication device 116A, such as a display space limit, a display configuration in the media reproduction software, or a memory limit, and can tailor the recommendation to match this limit.

In one embodiment, the recommendation server 130 can send a recommendation including references to more media content items than can be displayed at the mobile communication device 116A at any one time. The recommendation can be displayed by the mobile communication device 116A in sections, such as pages, panels, or screens, so that the user can navigate through the recommendation items using the graphical user interface capabilities of the device 116A. In one embodiment, the recommendation server 130 can send a recommendation where the data files associated with the reference media content items are too large to be stored at the mobile communication device 116A. In one embodiment, the mobile communication device 116A can review the metadata information included with each reference to extract the data size for each media content item. The mobile communication device 116A can determine a cumulative size of memory necessary for storage of each addition media content item and can use this information to determine what portion of the recommended media content can be stored. In one embodiment, the mobile communication device 116A can display the full listing of suggest media content items to the user and indicate to the user that the device 116A is not capable of completely storing all of the items. The mobile communication device 116A can ask the user to take corrective action by selecting which items to keep in the list, by selecting which items to remove from the list, and/or by deleting the entire list.

Figure 3:
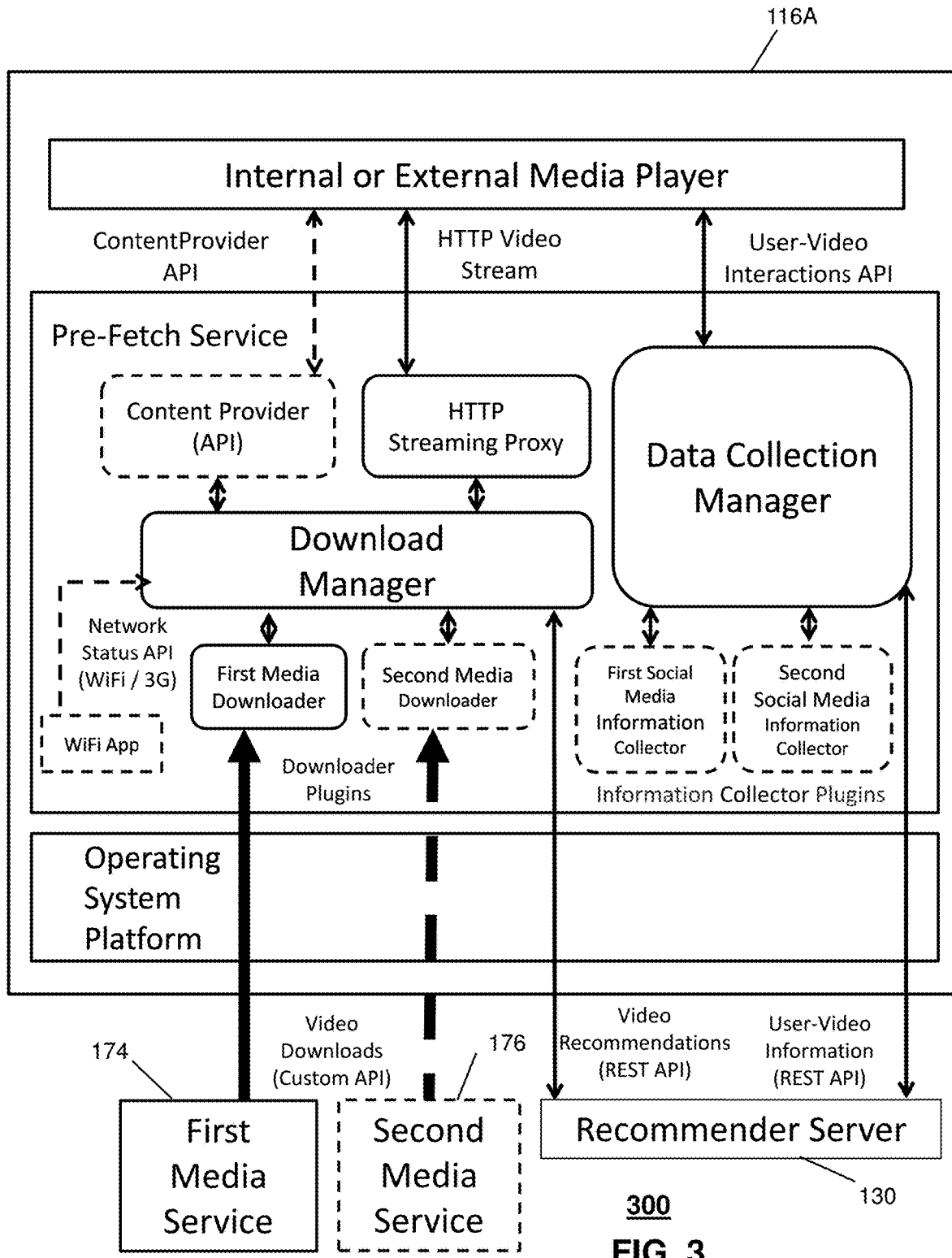
FIG. 3 depicts a block diagram of a pre-fetch service for a mobile communication device.

FIG. 3 depicts a block diagram of a pre-fetch service for a mobile communication device. In one embodiment, after mobile communication device 116A has downloaded the recommendation from the recommendation server 130, then the mobile communication device can pre-fetch or pre-download that media content referenced by the recommendation. The recommendation can reflect an attempt to predict media content that a user of the mobile communication device 116A may desire to experience. Or, in the alternative, the recommendation can reflect an attempt to encourage the user to select media content that the user should prefer. In either case, by pre-fetching the recommended media content from media content sources 174 and 176, the mobile communication device 116A can offer immediate access to media content selections that are likely to be satisfying to the user of the device 116A.

In one embodiment, the mobile communication device 116A can determine an efficient means for downloading media content in to the cache memory of the device 116A. In one embodiment, the mobile communication device 116A can detect a wireless networks supported by an access device, such as gateway device 104A. The gateway device 104A can be connected to the internet network 155 via a service provider system that can provide constant or nearly constant data communications. In one embodiment, the mobile communication device 116A can detect an available wireless network and can automatically connect to the gateway device for supporting data communications through the internet network 155. In another embodiment, the mobile communication device 116A can signal the user of the device 116A to indicate the detection of the wireless network and to allow the user to initiate the link.

Once the mobile communication device 116A has established a wireless connection to the internet network 155 via a gateway device 104A, the mobile communication device 116A can attempt to pre-fetch one or more media content items referenced by the recommendation. In one embodiment, the mobile communication device 116A can determine the type of wireless connection that has been established and use this information to further determine whether to attempt to pre-fetch media content. In one embodiment, the mobile communication device 116A can collect information from the gateway device 104A to identify and/or estimate location, signal strength, and/or bandwidth for the connection. For example, the mobile communication device 116A can analyze an internet address and/or a machine access code of a gateway device 104A to identify a home internet access point. The mobile communication device 116A can use location information from the mobile communication device 116A, such as global positioning system information, to determine and/or confirm a location for the wireless connectivity. Similarly, the mobile communication device 116A can determine if the wireless access point is a business gateway 104B or a vehicle gateway 104C or another type of gateway. In one embodiment, the mobile communication device 116A can use the location or type of gateway 104A-C and a pre-fetch policy to determine whether to pre-fetch media content. For example, the mobile communication device 116A pre-fetch policy can direct the mobile communication device 116A to pre-fetch content over a Wi-Fi link to the internet if the gateway 104A is a home internet access point for the user or subscriber of the mobile communication device 116A. However, if the gateway 104B is identified as a business gateway or, more particularly, a gateway for the user's employer, then the policy can direct the mobile communication device 116A to prohibit pre-fetching. In another example, if the gateway 104C is identified as a Wi-Fi internet access point in the user's vehicle, the policy can direct the mobile communication device 116A to a pre-fetch action for this circumstance. The mobile communication device 116A can, for example, notify the user that the vehicle Wi-Fi has been detected and ask for permission to perform a pre-fetch.

In one embodiment, the mobile communication device 116A can further determine a predicted Wi-Fi connection time. The mobile communication device 116A can assess characteristics of the Wi-Fi connection—location, strength, time of day, day of week—and predict how long the mobile communication device 116A is likely to remain at the location and, consequently, how much time is available for pre-fetch activities. The mobile communication device 116A can further assess the quality of the Wi-Fi internet connection to estimate a digital bandwidth or throughput available for pre-fetch activities. Based on the estimated connection time and the estimated bandwidth, the mobile communication device 116A can determine if it is feasible to begin downloading media content from a remote media content server 176.

If it is feasible to pre-fetch content, then the mobile communication device 116A can further assess the media content items which have been recommended for pre-fetch by the recommendation server 130. In one embodiment, the mobile communication device 116A can begin with a media content item with a highest ranking or priority according to the recommendation. For example, the recommendation server 130 can provide a ranking of each of X media content items from 1 to X. In another embodiment, the mobile communication device 116A can prioritize the recommended media content such that items that the user has marked as selected for later viewing/listening can be given highest priority. Conversely, items that have been marked for deletion or that have already been viewed/listened to can be given a lowest priority for pre-fetching. In another embodiment, the mobile communication device 116A can access size information for the recommended media content items. The size information can be included in the references for the media content. The mobile communication device 116A can assess the size of the highest priority media content item along with the estimated Wi-Fi connectivity time and the estimated throughput to determine if the highest priority media content item should, in fact, be downloaded into the mobile communication device 116A at this time. For example, if the highest priority media content item will require a large data download but the combination of the estimated connectivity time and estimated throughput fall below a threshold, then the mobile communication device 116A can determine that pre-fetch of the highest priority item will be postponed. In this case, the mobile communication device 116A can proceed to evaluate the second highest priority item for pre-fetching. If the second highest priority item is a better fit for the available timing and bandwidth of the Wi-Fi connection, then the mobile communication device 116A can begin to download this media content from the media content source 176. If the second highest priority media content does not meet the threshold requirements for timing and bandwidth, then the mobile communication device 116A can proceed to the third highest priority item, and so forth, to select a media content item for pre-fetching.

In one embodiment, the pre-fetch policy can include a feature, where any changes to the Wi-Fi connection cause the mobile communication device 116A to restart the pre-fetch priority assessment. For example, if the mobile communication device 116A detects that the throughput for the Wi-Fi connection at the gateway 104A significantly improves, such that the throughput can support the large data requirements of the highest priority media content item, then the policy can dictate that the mobile communication device 116A make the first priority item the next pre-fetch item. In one embodiment, where the mobile communication device 116A determines that the Wi-Fi connection has degraded substantially, the policy can dictate that the mobile communication device 116A stop further pre-fetching activity.

In one embodiment, prior to pre-fetching, the mobile communication device 116A can assess the available cache memory at the mobile communication device 116A that is available for storage of pre-fetched media content. In one embodiment, the mobile communication device 116A can compare the available storage capacity in the cache memory to the recommended media content items and determine if there is enough capacity to pre-fetch every recommended item. If there is sufficient capacity, then the pre-fetch policy can direct the mobile communication device 116A to pre-fetch based on priority according to the available Wi-Fi connection bandwidth. However, if there is not sufficient capacity for all of the items, then the pre-fetch policy can direct the mobile communication device 116A to determine if there is sufficient capacity for the highest priority item that has been selected for pre-fetching. If capacity is sufficient for the highest priority item, then this item can be pre-fetched. However, if there is not sufficient capacity, then the pre-fetch policy can direct the mobile communication device 116A to evict previously pre-fetched media content from the cache memory to free up space according to a cache management policy.

Figure 4:
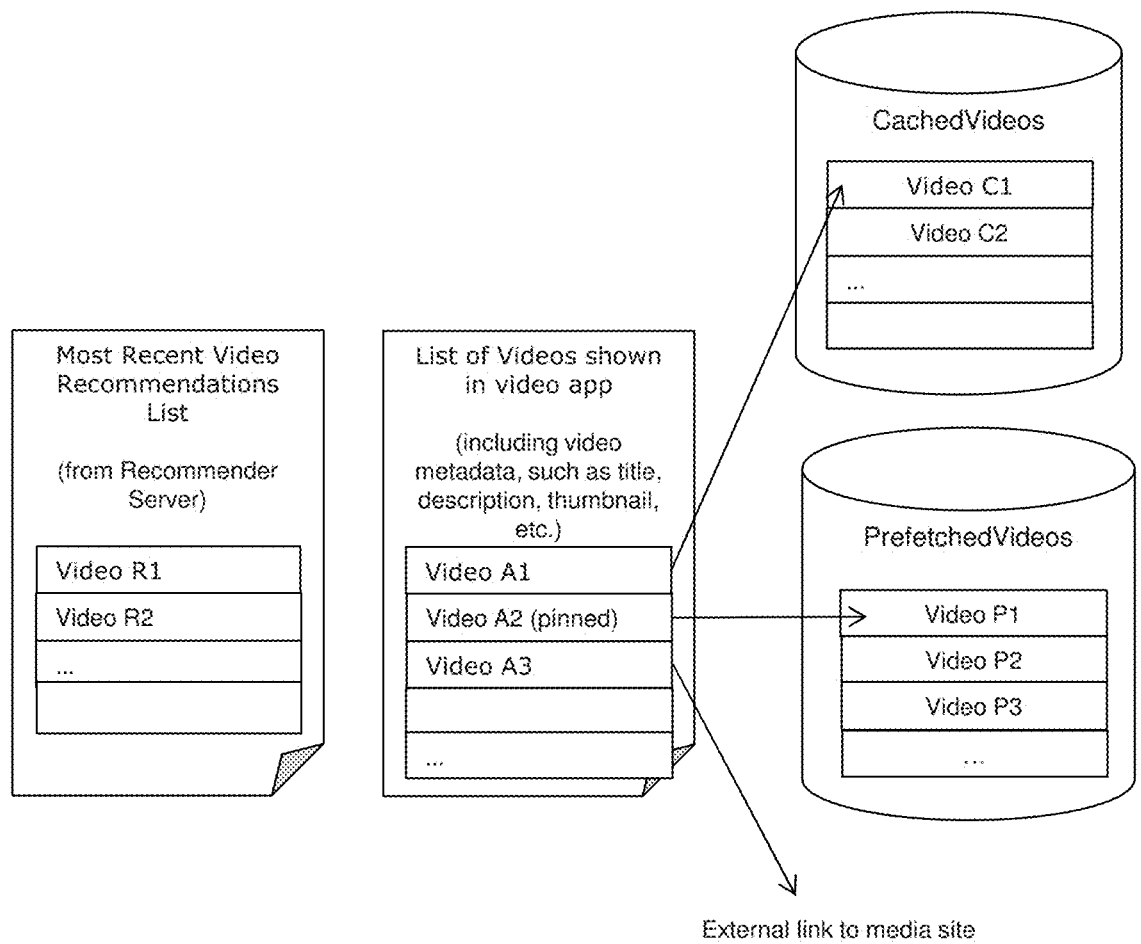
FIG. 4 depicts a pre-fetch service cache management policy.

FIG. 4 depicts a pre-fetch service cache management policy. In one embodiment, the cache management policy can determine the eviction of deletion of media content items currently stored in the cache memory to make room for new media content items. In one embodiment, the cache management policy can determine rankings of media content items in the cache memory. The rankings can be based on how these media content items were ranked when they were recommended by the recommendation server 130. Recommendation rankings can be maintained and stored along with media content in the cache memory. It is possible that multiple media content items can share the same recommendation ranking if these items were recommended at different times. In one embodiment, if stored media content items share a ranking, then the policy can arbitrate ranking priority based on how long the item has been stored and/or the popularity of this item amongst all users. For example, the policy can arbitrate equal rankings by evicting older items over new items. In one embodiment, the cache management policy can cause the mobile communication device to evict one or more items, by lowest ranking and/or priority, to make enough room for the next pre-fetch item. In another embodiment, the cache management policy can cause the mobile communication device 116A retain items that are marked as selected for viewing/listening. In one embodiment, the cache management policy can direct the mobile communication device 116A to evict items sufficient to free up space for every newly recommended item.

In one embodiment, the mobile communication device 116A can pre-fetch media content using the IMS network 150 during non-peak hours and/or during hours of reduced traffic and/or download costs. The mobile communication device 116A can determine that there is no available Wi-Fi access point to the internet network 155 The mobile communication device 116A can further determine that the IMS network has entered a non-peak hour condition. In one embodiment, the mobile communication device 116A can determine the non-peak hour operation by simply checking its internal clock. In another embodiment, the mobile communication device 116A can inquire to the IMS network 150 and allow the IMS network to definitively determine that the non-peak operation and rules apply. Once the mobile communication device 116A has identified that the IMS network is operating at the non-peak condition and/or has been given permission to operate under non-peak rules, then the mobile communication device 116A can begin a pre-fetch operation. During the pre-fetch operation, the mobile communication device 116A can access media content services via the internet network 155 by way of the IMS network 150. The mobile communication device 116A can pre-fetch recommended media content via IMS data access and can store the downloaded content in the cache memory, In one embodiment, the mobile communication device 116A can access the pre-fetch materials from its cache memory using a media reproduction application. As the user accesses the stored media content, media activity information is collected and shared with the recommendation server 130 for use in generating the next recommendation.

In one embodiment, the recommendation service can be included in a new mobile communication device 116A as a default application service. The user can accept or reject participation in the service. If the user agrees to participate, then the user agrees to provide information from the mobile communication device 116A to the recommendation server 130 for use by the recommendation server 130 in generating recommendations for the mobile communication device 116A and for other subscribers to the service. If the user rejects participation, then the mobile communication device 116A can stop transmitting media activity information to the recommendation sever 130.

Figure 5:
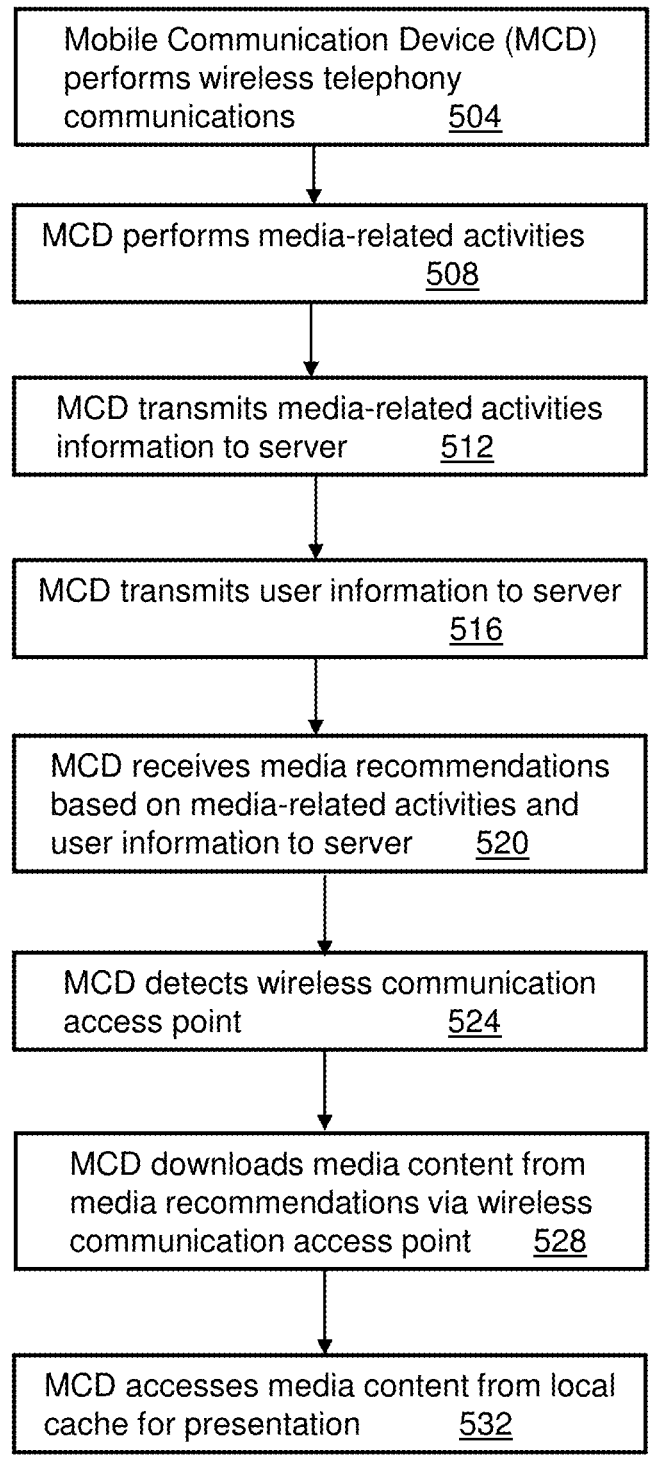
FIG. 5 depicts an illustrative embodiment of a method operating in portions of the system described in FIGS. 1-4 and 6-7.

FIG. 5 depicts an illustrative embodiment of a method operating in portions of the system described in FIGS. 1-4 and 6-7. Method 500 can begin with step 504, in which a mobile communication device 116A performs wireless telephony communications. The wireless telephony communications can include transmission and reception of voice, data, and/or text information. The mobile communication device 116A can communicate with the IMS network 150 using one or more components of a mobility network 117, such as cellular base stations for receiving and transmitting wireless communication signals.

In step 508, the mobile communication device 116A can perform media related activities. The media related activities can include viewing videos, listening to music, and/or viewing images. The mobile communication device 116A can track media content, including video, audio, pictures, and/or text that are accessed by the device 116A. For example, all media content that is accessed from media content service sites 174 and 176, social network sites 180, and/or any other source of downloadable content can be logged in a media content history log. In another embodiment, the mobile communication device 116A can log any media content that is presented, reproduced, loaded onto, and/or viewed at the device 116A. For example, the mobile communication device 116A can log media content captured by a camera and/or microphone of the device 116A and/or loaded onto the device via a port, such as a USB port.

In step 512, the mobile communication device 116A can transmit to the recommendation server 160 information associated with media activity at the device 116A. The information can be raw log information including titles, dates, sources, and/or metadata associated with the content. In one embodiment, the mobile communication device 116A can provide filtered or summarized information, such as only providing information regarding media content downloaded via the network 100 or only information regarding media content that was provided under a subscription agreement.

In step 516, the mobile communication device 116A can transmit to the recommendation server 130 information associated with one or more users of the mobile communication device 116A. A user profile can provide the recommendation server 130 with demographic information, such as the age and sex of the user, and/or subscription level information, such as data plan capability. The user profile can also provide configuration information from the mobile communication device, such as memory settings for storing media content and default applications for accessing media content.

In step 520, the mobile communication device 116A can receive a recommendation from a recommendation server 130. The recommendation server 130 can use media activity information collected from the network 100, which may reflect information about media content (e.g., popularity, metadata), to further direct the generation of the recommendation. Information about relative popularity of a specific media item can be combined with information about the user's past video viewing to confirm or to deny the inclusion of an item in the recommended list.

In one embodiment, the recommendation server 130 can use the user profile information from the mobile communication device 116A to direct the generation of the recommendation. The recommendation server 130 can choose to omit an otherwise popular item, such as the latest song from a teenage band, where the user profile of the mobile communication device indicates that the user is in her seventies. The recommendation server 130 can omit from the recommendation an otherwise popular picture or video or can specify in the recommendation a link to a version of the picture or video that can be reproduced with a limited display capability.

In step 524, the mobile communication device 116A can detect the presence of one or more wireless networks that can be supported by one or more access devices, such as gateway or router devices 104A-C. The gateway devices 104A-C can be part of a communication infrastructure at, for example, a home, business, or vehicle. A gateway device 104A can be connected to the internet network 155 via a service provider system that can provide constant or nearly constant data communications. The gateway device 104A can provide a Wi-Fi communication link between the gateway device 104A and nearby devices that are Wi-Fi capable. In one embodiment, the mobile communication device 116A can detect an available wireless network and can automatically connect to the gateway device for supporting data communications through the internet network 155. In another embodiment, the mobile communication device 116A can signal the user of the device 116A to indicate the detection of the wireless network and to allow the user to initiate the link.

In step 528, the mobile communication device 116A can pre-fetched one or more media content items referenced by the recommendation. In one embodiment, the mobile communication device 116A can determine the type of wireless connection that has been established and use this information to further determine whether to attempt to pre-fetch media content. The mobile communication device 116A can collect information from the gateway device 104A to identify and/or estimate location, signal strength, and/or bandwidth for the connection. The mobile communication device 116A can analyze an internet address and/or a machine access code of a gateway device 104A to identify a home internet access point. The mobile communication device 116A can use location information from the mobile communication device 116A, such as global positioning system information, to determine and/or confirm a location for the wireless connectivity. The mobile communication device 116A can use the location or type of gateway 104A-C and a pre-fetch policy to determine whether to pre-fetch media content.

The mobile communication device 116A can further determine a predicted Wi-Fi connection time and predict how long the mobile communication device 116A is likely to remain at the location and, consequently, how much time is available for pre-fetch activities. The mobile communication device 116A can further assess the quality of the Wi-Fi internet connection to estimate a digital bandwidth or throughput available for pre-fetch activities. Based on the estimated connection time and the estimated bandwidth, the mobile communication device 116A can determine if it is feasible to begin downloading media content from a remote media content server 176.

Figure 6:
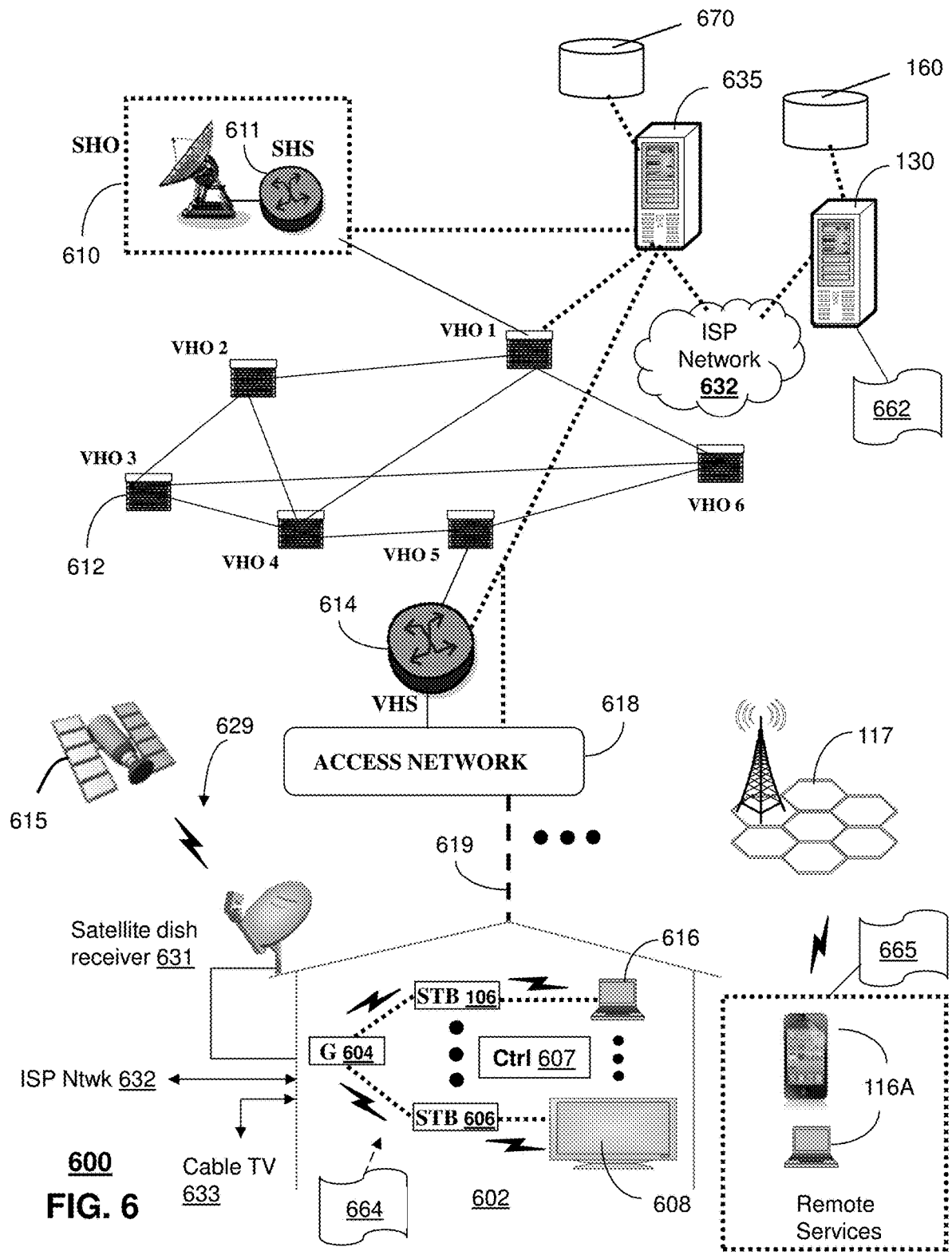
FIGS. 6-7 depict illustrative embodiments of communication systems that provide media content recommendations and pre-fetched media content to mobile communication devices according to embodiments illustrated in FIGS. 1-6.

FIG. 6 depicts an illustrative embodiment of a first communication system 600 for delivering media content. The communication system 600 can represent an Internet Protocol Television (IPTV) media system. Communication system 600 can be overlaid or operably coupled with the system of FIG. 1 that can be utilized for providing remote control of devices and services via mobile communication devices as another representative embodiment of communication system 600. In one embodiment, the system 600 can include one or more servers 130 and 635 associated with an IMS network 150. In one embodiment, a recommendation server 130 can receive communications from a mobile communication device 116A over a mobility network 117. The mobile communication device 116A can provide information to the recommendation server 130 regarding media activities, applications, and user configurations associated with the mobile communication device 116A. The recommendation server 130 can also receive media content popularity information associated with network traffic at elements of a network 100 associated with the recommendation server 130. The recommendation server 130 can user the collected information to generate a recommendation of media content for the mobile communication device 116A. The recommendation can be sent to the mobile communication device 116A. The mobile communication device 116A can detect a Wi-Fi network 124A of a gateway 104A for accessing media content services 174 by way of an internet network 155. The mobile communication device 116A can pre-fetch media content from the media content service 174 according to the recommendation.

The IPTV media system can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 400. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services.

The subject disclosure can apply to other present or next generation over-the-air and/or landline media content services system.

Some of the network elements of the IPTV media system can be coupled to one or more computing devices 130, a portion of which can operate as a recommendation server for providing remote audio command services to mobile communication devices 116A over the ISP network 632.

Communication system 600 can also provide for all or a portion of the computing devices 130 to function as a recommendation server 130. The recommendation server 130 can use computing and communication technology to perform function 662, which can include among other things, receiving communications from a mobile communication device 116A over a mobility network 117. The mobile communication device 116A can provide information to the recommendation server 130 regarding media activities, applications, and user configurations associated with the mobile communication device 116A. The recommendation server 130 can also receive media content popularity information associated with network traffic at elements of a network 100 associated with the recommendation server 130. The recommendation server 130 can user the collected information to generate a recommendation of media content for the mobile communication device 116A. The recommendation can be sent to the mobile communication device 116A. The mobile communication device 116A can detect a Wi-Fi network 124A of a gateway 104A for accessing media content services 174 by way of an internet network 155. The mobile communication device 116A can pre-fetch media content from the media content service 174 according to the recommendation. The media processors 106 and wireless communication devices 116 can be provisioned with software functions 664 and 665, respectively, to utilize the services of recommendation server 130.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
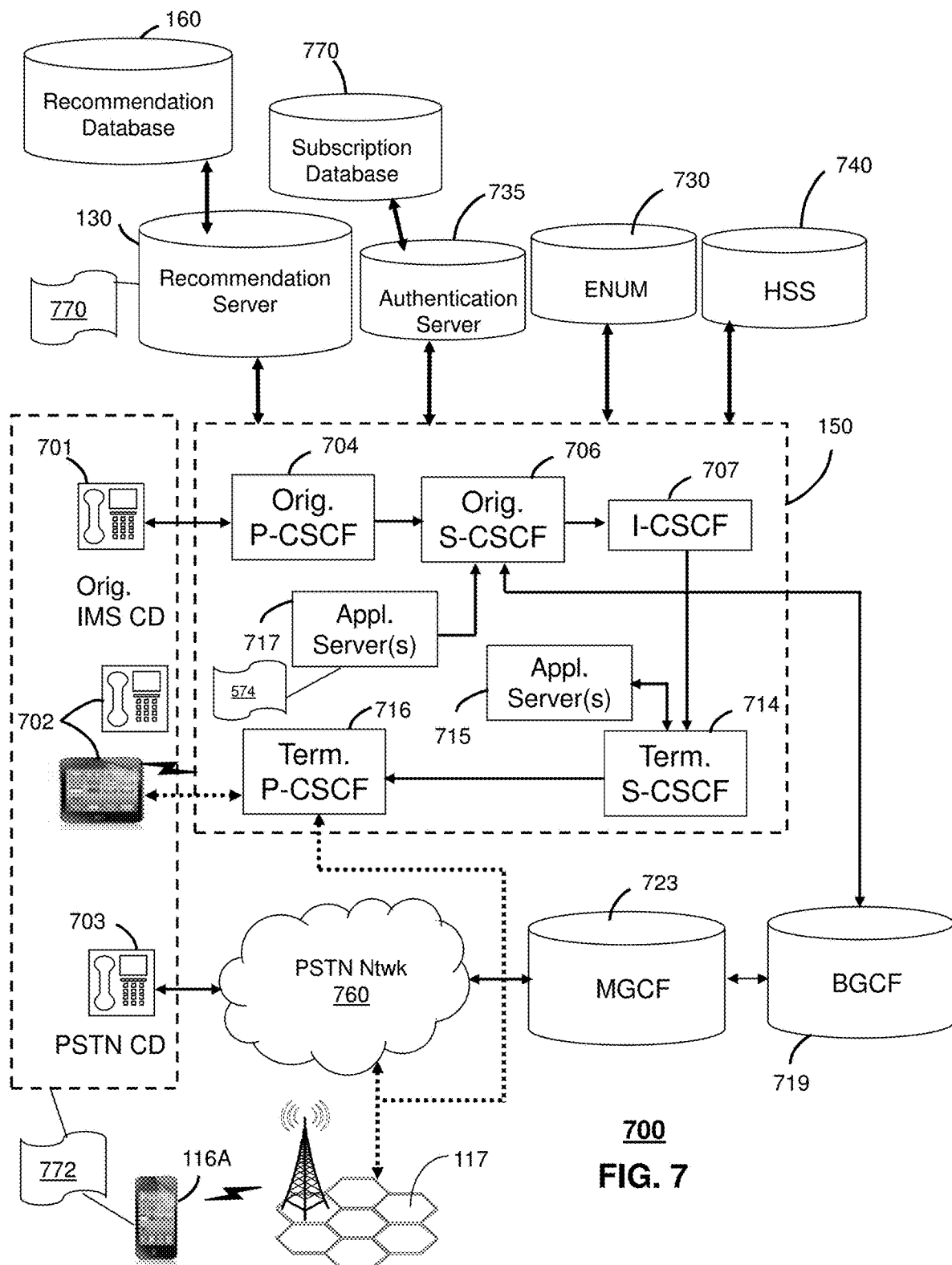

FIG. 7 depicts an illustrative embodiment of a communication system 700 employing an IP Multimedia Subsystem (IMS) network architecture to facilitate the combined services of circuit-switched and packet-switched systems. Communication system 700 can be overlaid or operably coupled with the systems of FIG. 1 or FIG. 6 and communication systems 100 and 600 as another representative embodiment of communication systems 100 and 600. In one embodiment, the system 700 can include one or more servers 130 and 635 associated with the IMS network 150. In one embodiment, the system 600 can include one or more servers 130 and 635 associated with an IMS network 150. In one embodiment, a recommendation server 130 can receive communications from a mobile communication device 116A over a mobility network 117. The mobile communication device 116A can provide information to the recommendation server 130 regarding media activities, applications, and user configurations associated with the mobile communication device 116A. The recommendation server 130 can also receive media content popularity information associated with network traffic at elements of a network 100 associated with the recommendation server 130. The recommendation server 130 can user the collected information to generate a recommendation of media content for the mobile communication device 116A. The recommendation can be sent to the mobile communication device 116A. The mobile communication device 116A can detect a Wi-Fi network 124A of a gateway 104A for accessing media content services 174 by way of an internet network 155. The mobile communication device 116A can pre-fetch media content from the media content service 174 according to the recommendation. Communication system 700 can comprise a Home Subscriber Server (HSS) 740, a tElephone NUmber Mapping (ENUM) server 730, and other network elements of an IMS network 150. The IMS network 150 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 150 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (aSs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 730 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication systems 100 and 600 of FIGS. 1 and 6, respectively.

If the terminating communication device is instead a PSTN CD such as CD 703 or CD 705 (in instances where the cellular phone only supports circuit-switched voice communications), the ENUM system 730 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 117, a femtocell, a WiFi router, a Digital Enhanced Cordless Telecommunications (DECT) base unit, or another suitable wireless access unit to establish communications with the IMS network 150 of FIG. 7. The cellular access base station 117 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices. In this embodiment, the cellular base station 117 may communicate directly with the IMS network 150 as shown by the arrow connecting the cellular base station 117 and the P-CSCF 716.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The recommendation server 130 of FIG. 7 can be operably coupled to the second communication system 700 for purposes similar to those described above. Recommendation server 130 can perform function 770 and thereby provide recommendation services to the CDs 701, 702, 703 and 705 of FIG. 7. CDs 701, 702, 703 and 705, which can be adapted with software to perform function 772 to utilize the services of the recommendation server 130. Recommendation server 130 can be an integral part of the application server(s) 717 performing function 774, which can be substantially similar to function 662 and adapted to the operations of the IMS network 150.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3rd Generation Partnership Project (3GPP). It is further noted that some or all embodiments of the subject disclosure may in whole or in part modify, supplement, or otherwise supersede final or proposed standards published and promulgated by 3GPP.

Figure 8:
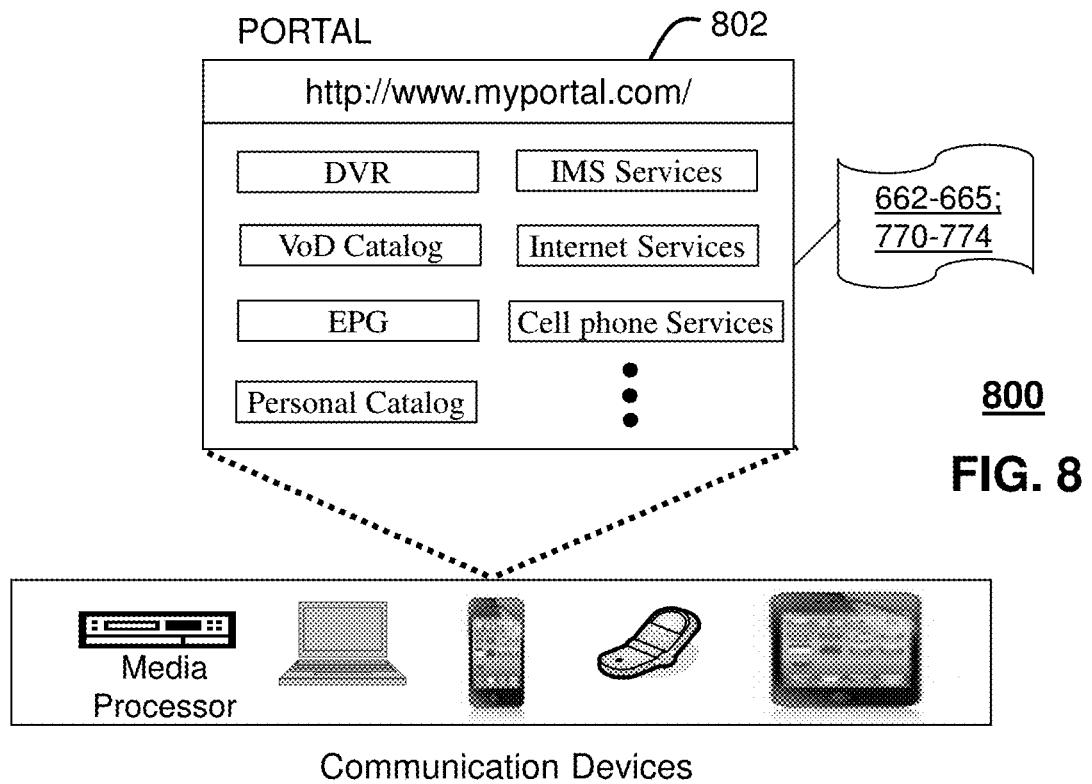
FIG. 8 depicts an illustrative embodiment of a web portal for configuring recommendation services and pre-fetched media content for devices according to the communication systems of FIGS. 1, 6, and 7.

FIG. 8 depicts an illustrative embodiment of a web portal 802 which can be hosted by server applications operating from the recommendation server devices 130 of the communication system 100 illustrated in FIG. 1. Communication system 800 can be overlaid or operably coupled with communication system 100, and/or communication system 600, and/or communication system 700 as another representative embodiment of system of FIG. 1, communication system 600, and/or communication system 700. In one embodiment, the system 600 can include one or more servers 130 and 635 associated with an IMS network 150. In one embodiment, a recommendation server 130 can receive communications from a mobile communication device 116A over a mobility network 117. The mobile communication device 116A can provide information to the recommendation server 130 regarding media activities, applications, and user configurations associated with the mobile communication device 116A. The recommendation server 130 can also receive media content popularity information associated with network traffic at elements of a network 100 associated with the recommendation server 130. The recommendation server 130 can user the collected information to generate a recommendation of media content for the mobile communication device 116A. The recommendation can be sent to the mobile communication device 116A. The mobile communication device 116A can detect a Wi-Fi network 124A of a gateway 104A for accessing media content services 174 by way of an internet network 155. The mobile communication device 116A can pre-fetch media content from the media content service 174 according to the recommendation.

The web portal 802 can be used for managing services of communication systems 100, 400, and/or 500. A web page of the web portal 802 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1, 6, and 7. The web portal 802 can be configured, for example, to access a media processor 606 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 606. The web portal 802 can also be used for provisioning IMS services described earlier, provisioning Internet services, provisioning cellular phone services, and so on.

The web portal 802 can further be utilized to manage and provision software applications 662-665, and 770-774 to adapt these applications as may be desired by subscribers and service providers of communication systems 100, 400, and/or 500.

Figure 9:
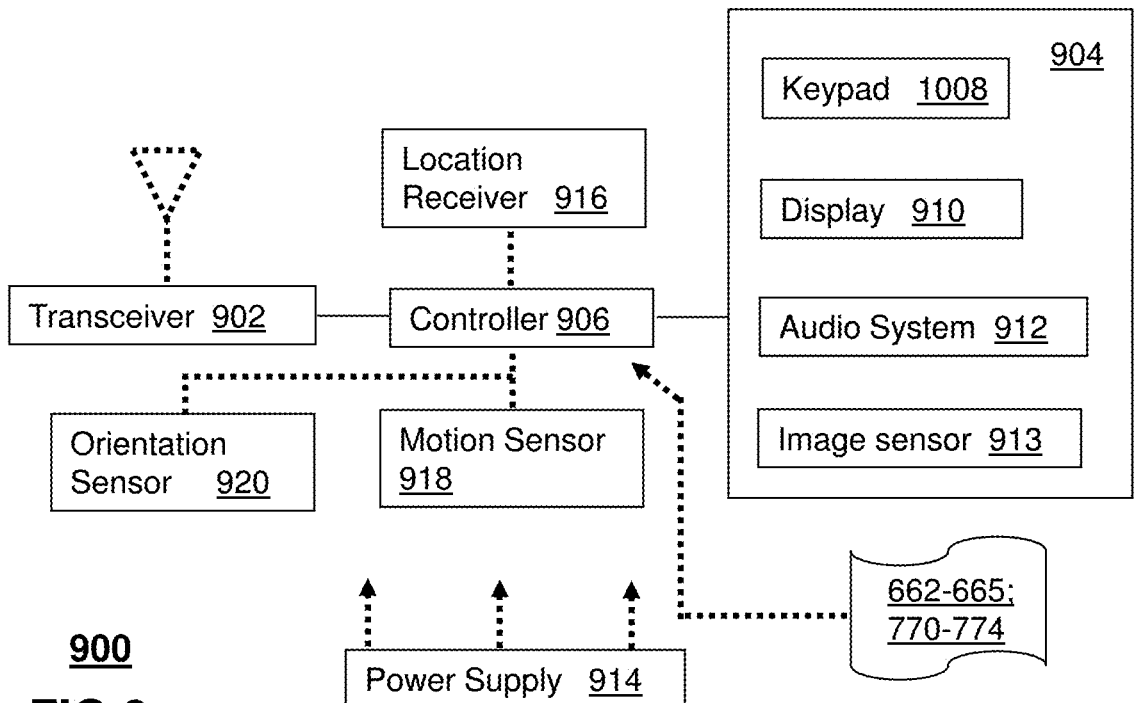
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIGS. 1, 6, and 7. In one embodiment, the communication device 900 can be a mobile communication device 116A that communicates with a recommendation server 130. In one embodiment, the system 600 can include one or more servers 130 and 635 associated with an IMS network 150. In one embodiment, a recommendation server 130 can receive communications from a mobile communication device 116A over a mobility network 117. The mobile communication device 116A can provide information to the recommendation server 130 regarding media activities, applications, and user configurations associated with the mobile communication device 116A. The recommendation server 130 can also receive media content popularity information associated with network traffic at elements of a network 100 associated with the recommendation server 130. The recommendation server 130 can user the collected information to generate a recommendation of media content for the mobile communication device 116A. The recommendation can be sent to the mobile communication device 116A. The mobile communication device 116A can detect a Wi-Fi network 124A of a gateway 104A for accessing media content services 174 by way of an internet network 155. The mobile communication device 116A can pre-fetch media content from the media content service 174 according to the recommendation.

To enable these features, communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of the media processor 606, the media devices 608, or the portable communication devices 616 and 116A of FIG. 6, as well as the IMS CDs 701-702 and PSTN CDs 703-705 and mobile communication devices 116A of FIG. 7. It will be appreciated that the communication device 900 can also represent other devices that can operate in communication systems 600-700 of FIGS. 6-7 such as a gaming console and a media player.

The communication device 900 shown in FIG. 9 or portions thereof can serve as a representation of one or more of the devices of the communication system 100 of FIG. 1, the communication system 600 of FIG. 6, and the communication system 500 of FIG. 7. In addition, the controller 906 can be adapted in various embodiments to perform the functions 662-665 and 770-774, respectively.

Upon reviewing the aforementioned embodiments, it would be evident to an artisan with ordinary skill in the art that said embodiments can be modified, reduced, or enhanced without departing from the scope and spirit of the claims described below. For example, in one embodiment, a pre-fetch policy in a mobile communication device can accept a plan for traveling. The plan can include information regarding destination, route, distance, and/or length of time for the traveling. The pre-fetch policy can direct the mobile communication device to pre-fetch information related to the travel, such as entertainment content for the traveling group, key information about points of interest, and the like. In one embodiment, the pre-fetch policy can take into account contextual information to determine what information to recommend.

In another embodiment, the recommendation server 130 can determine, based on information from several mobile communication devices, users of those devices, who are a proximate audience for media content that could be played on any of the devices. The recommendation server 130 can recommend content for the entire group of users.

In one or more embodiments, multiple wireless interfaces operating according to multiple different wireless protocols can be simultaneously utilized by the communication device 900.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
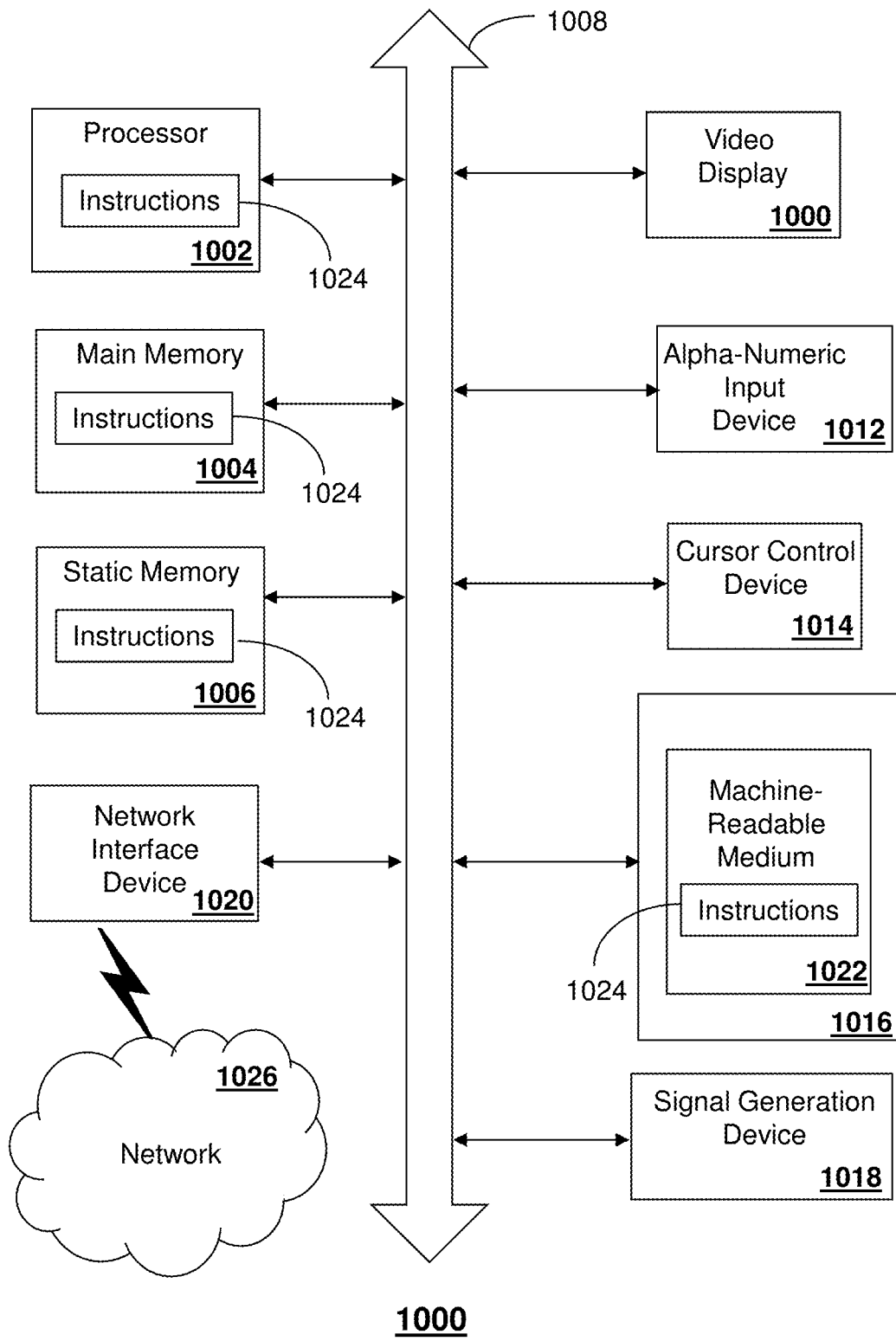
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods describe above. One or more instances of the machine can operate, for example, as the recommendation server 130, mobile communication device 106A, gateway device 104A-D, and/or media processor 406 of FIGS. 1, 4, and 5. In some embodiments, the machine may be connected (e.g., using a network 1026) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display. The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 1000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory, machine-readable storage medium, comprising executable instructions that, when executed by a processing system including a processor, facilitate performance of operations, the operations comprising:
    transmitting, via a connection to a network having an available digital bandwidth, a first pre-fetch media content item of media content items included in a media recommendation, the first pre-fetch media content item having a first rank; and
    responsive to a determination of a change in the available digital bandwidth:
        stopping the transmitting of the first pre-fetch media content item; and
        transmitting, via the connection to the network a second pre-fetch media content item of media content items included in the media recommendation, the second pre-fetch media content item having a different rank.

2. The non-transitory, machine-readable storage medium of claim 1, wherein the media recommendation is based on information associated with a media-related activity of a mobile communication device.

3. The non-transitory, machine-readable storage medium of claim 2, wherein the media-related activity comprises consumption of media content.

4. The non-transitory, machine-readable storage medium of claim 2, wherein the media-related activity comprises accessing a site providing access to media content.

5. The non-transitory, machine-readable storage medium of claim 2, wherein the media-related activity comprises loading a mobile application that enables access to media content.

6. The non-transitory, machine-readable storage medium of claim 2, wherein the media-related activity comprises subscribing to a service providing access to media content.

7. The non-transitory, machine-readable storage medium of claim 2, wherein the operations further comprise accessing social media preference information of a social network associated with a user of the mobile communication device, wherein the media recommendation is further generated according to the social media preference information.

8. The non-transitory, machine-readable storage medium of claim 1, wherein the media recommendation comprises a plurality of media content items, wherein the operations further comprise accessing popularity information for the plurality of media contents items based on transactions with a network by a plurality of communication devices, wherein the media recommendation is further generated according to the popularity information.

9. The non-transitory, machine-readable storage medium of claim 1, wherein the different rank is lower than the first rank.

10. A method, comprising:
    transmitting, by a processing system including a processor and via a connection to a network having an available digital bandwidth, a first pre-fetch media content item of media content items included in a media recommendation, the first pre-fetch media content item having a first priority; and
    responsive to a determination of a change in the available digital bandwidth exceeding a threshold:
        stopping the transmitting of the first pre-fetch media content item; and
        transmitting, by the processing system and via the connection to the network a second pre-fetch media content item of media content items included in the media recommendation, the second pre-fetch media content item having a second priority lower than the first priority.

11. The method of claim 10, wherein the media recommendation is based on information associated with a media-related activity.

12. The method of claim 11, wherein the media-related activity comprises consumption of media content.

13. The method of claim 10, further comprising:
    ranking, by the processing system, a plurality of media content items included in the media recommendation according to a priority to generate a ranked list comprising the first priority and the second priority.

14. The method of claim 13, wherein the transmitting of the first pre-fetch media content item having the first priority further comprises transmitting a highest priority media content item included in the ranked list that can be completely prefetched within the available digital bandwidth associated with the connection to the network.

15. The method of claim 14, further comprising:
determining, by the processing system, that the change in the available digital bandwidth associated with the connection to the network exceeds the threshold, wherein the transmitting of the second pre-fetch media content item of the ranked list for which the available digital bandwidth associated with the connection to the network is sufficient to complete a transmission of the second pre-fetch media content item.

16. A server, comprising:
a processing system including a processor; and
a memory that stores executable instructions that, when executed by the processing system, facilitate performance of operations, the operations comprising:
  transmitting, via a connection to a network having an available digital bandwidth, a first pre-fetch media content item of media content items included in a media recommendation transmitted to a communication device, the first pre-fetch media content item having a first rank; and
  responsive to a determination of a change in the available digital bandwidth:
    stopping the transmitting of the first pre-fetch media content item; and
    transmitting, via the connection to the network a second pre-fetch media content item of media content items included in the media recommendation, the second pre-fetch media content item having a second rank.

17. The server of claim 16, wherein the media recommendation is based on information associated with a media-related activity.

18. The server of claim 16, wherein the media recommendation is based on information comprising a log of media content captured by a camera of the communication device, a microphone of the communication device, or a combination thereof.

19. The server of claim 16, wherein the operations further comprise:
ranking a plurality of media content items included in the media recommendation according to a priority to generate a ranked list, wherein the transmitting of the first pre-fetch media content item having the first rank further comprises transmitting a highest priority media content item included in the ranked list that can be completely prefetched by the communication device within the available digital bandwidth associated with the connection to the network.

20. The server of claim 19, wherein the operations further comprise:
determining that the change in the available digital bandwidth associated with the connection to the network exceeds a threshold, wherein the transmitting of the second pre-fetch media content item of the ranked list for which the available digital bandwidth associated with the connection to the network is sufficient to complete a transmission of the second pre-fetch media content item.

* * * * *